INVENTOR.
Lawrence Holmes Jr.

INVENTOR.
Lawrence Holmes Jr.
BY
Attorneys

INVENTOR.
Lawrence Holmes Jr.

INVENTOR.
Lawrence Holmes Jr.

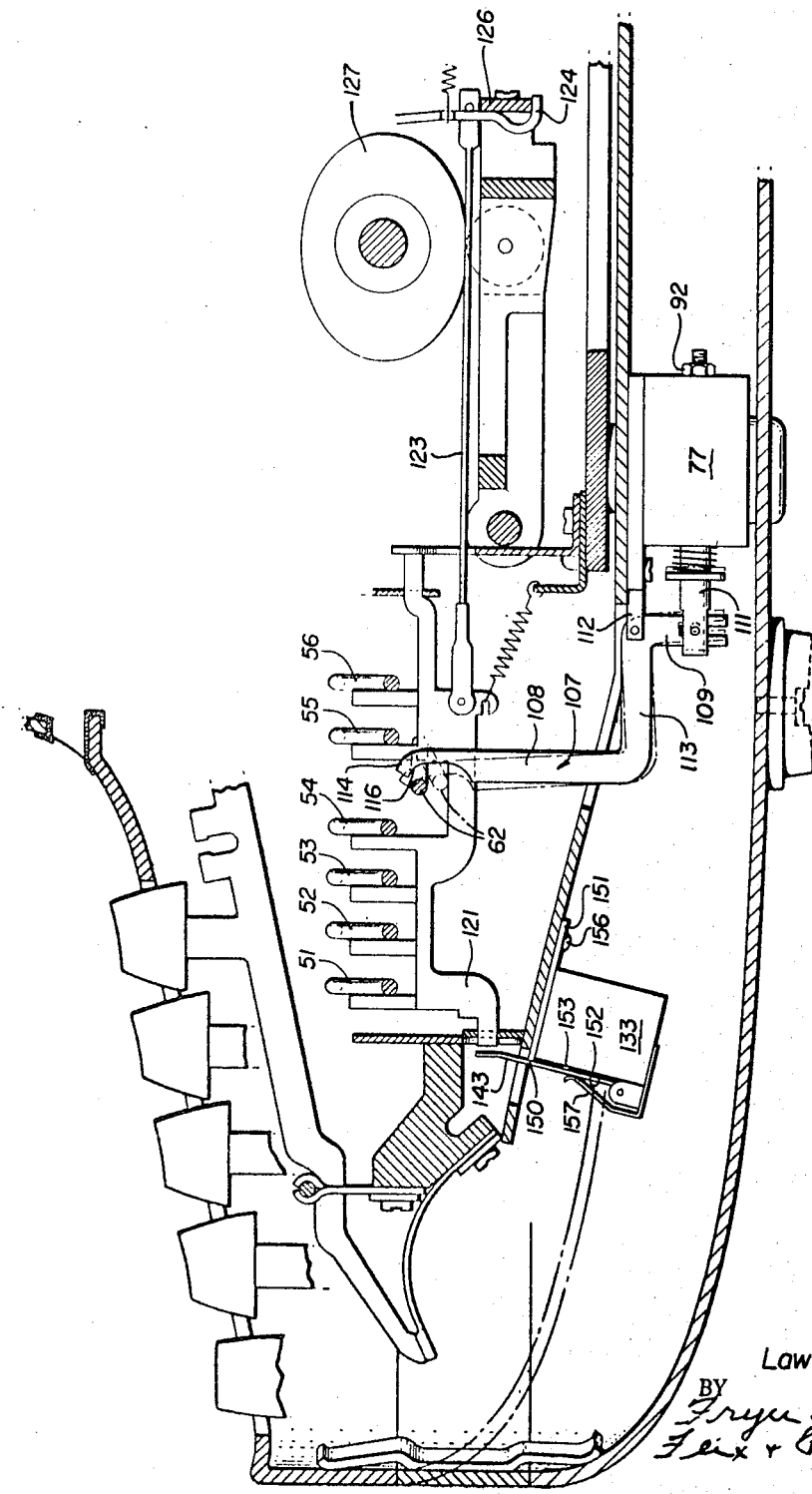

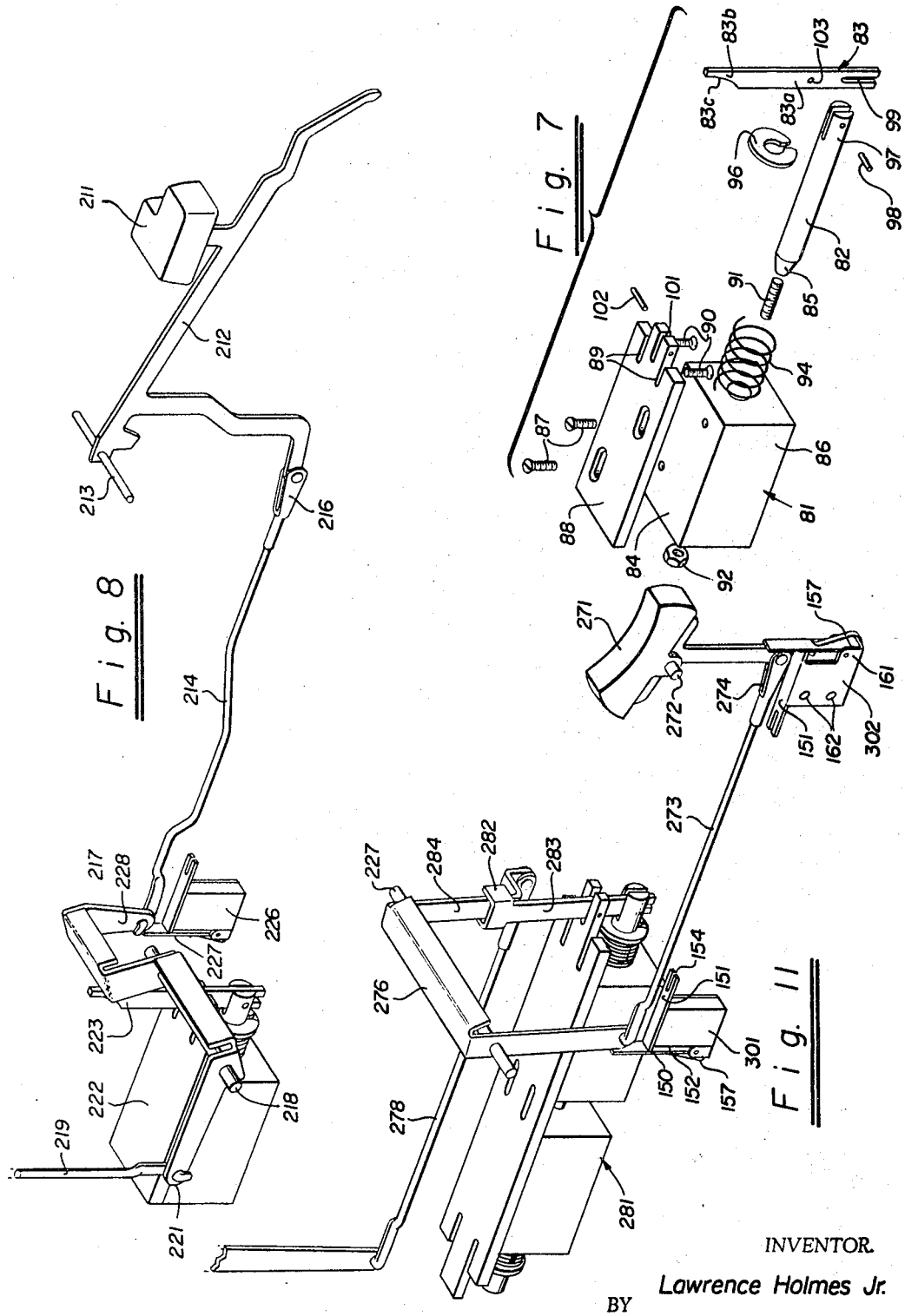

Fig. 10
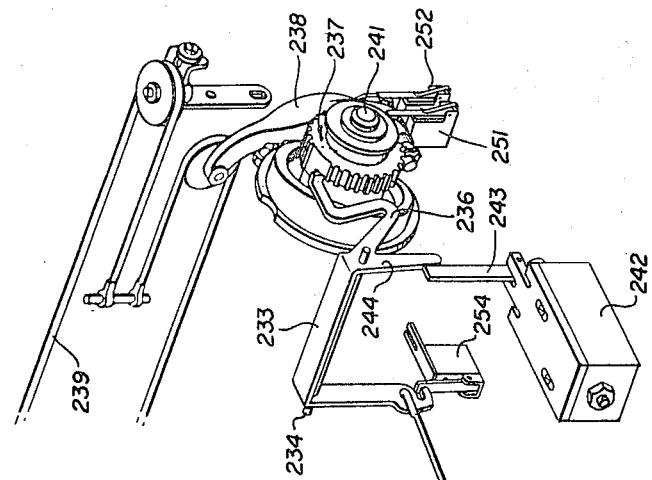
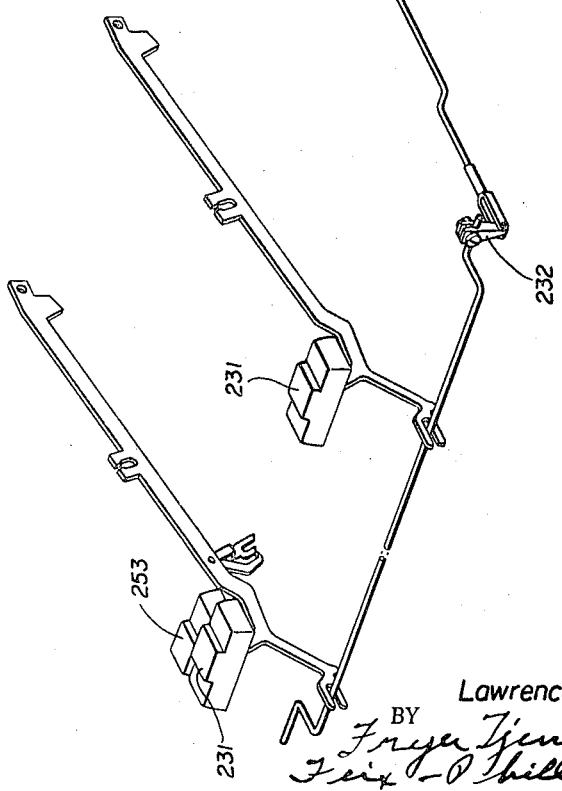
INVENTOR.
Lawrence Holmes Jr.
BY
Attorneys

United States Patent Office 3,452,851
Patented July 1, 1969

3,452,851
TYPEWRITER BASEPLATE ENABLING MACHINE OPERATION BY AND GENERATION OF ELECTRICAL SIGNAL
Lawrence Holmes, Jr., 108 Jones Blvd., Las Vegas, Nev. 89107
Filed Oct. 19, 1966, Ser. No. 587,874
Int. Cl. B41j 5/30
U.S. Cl. 197—19          27 Claims

ABSTRACT OF THE DISCLOSURE

A standard model typewriter is adapted for operating a second remote typewriter and for being operated thereby by means of a baseplate attachement which can be quickly fastened to the typewriter without requiring the fastening of elements of the baseplate to moving elements of the typewriter and without interfering with normal use of the typewriter as a writing instrument. The baseplate is a self-contained unit carrying all the mechanism needed for sensing, transmitting and receiving coded signals and for operating the associated typewriter in response thereto.

---

The present invention relates to typewriters and more particularly to means for expanding the capabilities of a typewriter to include long-distance communication, tape read-in and read-out and computer read-in and read-out.

Those typewriters known in the art which have long been used as computer read-in and read-out devices, retyping mechanisms and long-distance written communication receivers and senders, are not suitable for use as part of a widespread written communication network or as an input for a simple computer for use by laymen, for several reasons. First among these reasons is cost. If a written communication device is to be widely employed by the casual as well as the frequent user, it must be available at low cost. Data transmitting typewriters known today are without exception high cost items to obtain, maintain, and operate. The cost of operation of these devices is high due to the fact that they require specially trained typists, and are useful only as communication devices.

The present invention teaches a relatively inexpensive and simple base plate mechanism designed to be combined with a commercially available, mass produced, electric-powered typewriter. When the present invention and a typwriter are combined they provide a device which is capable of receiving electrical impulses and responding thereto by creating written information (typing), and producing electrical signals which represent the various operations which the typewriter performs when it is being operated. In addition, the typewriter produces signals which indicate that it has responded to an electrical signal, and completed the operation called for. This feature of the invention enables command signals to be properly timed via the base plate to prevent damage to the typewriter by a premature command.

One of the features of the present invention which clearly distinguishes it from the prior art is the ability to install it on, or remove it from any standard, production-line, IBM Selectric typewriter in approximately one minute. As will be more fully described below, none of the components of the invention which sense or initiate operation of the typewriter are interconnected to any of the components of the typewriter when the base plate is operatively disposed. Thus, to install the base plate it is only necessary to slip it into place and secure it to the typewriter frame. No other connections are required. Furthermore, the presence of the base plate in no way changes the operation of the typewriter; its capabilities as a wiring machine are in no manner diminished and the touch of the machine remains the same. This overcomes the second biggest drawback to known devices; the need for a specially trained operator. Thus, the data transmission and receive device which is created as a result of the combination of the present invention and an IBM Slectric typewriter, can be operated by any typist without special training, as either a typewriter or data transmitter. In addition, removal of the base plate from the typewriter restores the typewriter to its original condition whereby the normal maintenance required for a typewriter can be carried out without interference from the components which give the typewriter a data read-in and read-out capability.

Although the IBM Selectric typewriter has been specifically mentioned above and the detailed description of the invention is made with reference to the IBM Selectric typewriter, the invention is not necessarily limited to use therewith. The basic concepts of the present invention have general application to any typing devices having symbol selection mechanisms including binary selectors. The IBM Selectric is presently the only mass produced, commercially available typewriter with such a symbol selection mechanism, thus accounting for the constant reference thereto.

Those typewriters which are presently commercially available for data read-in and read-out purposes are equipped with special cams, covers, latch extensions, banks of solenoids and switches. The solenoids and switches are semi-permanently mounted to the frame of the typwriter by brackets with one or more solenoids and switches mechanically joined to the component of the typewriter to which they react or which they operate. The machine must be prepared to receive the various mounting brackets by drilling holes in the machine at numerous points. Typewriters of this description have the disadvantages that they are normally constructed on a limited production basis, causing them to be very high in cost. In addition, the normal maintenance of the typewriter is greatly hampered by the presence of the brackets, solenoids and switches which cannot be easily removed and which often render part replacements and adjustment which would be otherwise routine, major tasks that can put a typewriter fully out of service for relatively long periods of time. The presence of the switches and solenoids complicate maintenance to the extent of requiring specially trained servicemen to attend to these machines. Also, if one of the switches or solenoids should be in need of repair the entire typewriter unit is incapacitated until the repair is made. In addition, when solenoids and switches are removed to allow access to the typewriter for typewriter adjustments, maintenance or repair, the switches and solenoids must be carefully readjusted when replaced.

With the present invention the entire base plate unit which gives the typewriter data read-in and read-out capabilities, can be taken off the typewriter and immediately replaced while a single component is being repaired. Also, the removal of the base plate removes all switches and solenoids as a single unit and does not disturb the adjustment of any of them. Therefore, reinstallation of the base plate does not require readjustment of the base plate components. Thus, the present invention not only produces a less expensive device with all of the operating capabilities of more expensive devices, but also significantly reduces the difficulty in performing normal service and repair and eliminates wasteful downtime of the machine.

Accordingly, it is an object of the present invention to provide a base plate for a standard IBM Selectric typewriter which when operatively disposed on the typewriter gives the typewriter the capability of receiving electrical impulses and being operated thereby, as well as the capability of transmitting electrical impulses in response to and as identification of typewriter operations.

It is another object of the present invention to provide a base plate for a typewriter which gives the typewriter electric signal generating and electric signal response capabilities, wherein, when operatively disposed, none of the base plate components which operate typewriter components or respond to the movement of typewriter components are interconnected with any of the typewriter components.

It is still another object of the present invention to provide unique switch and solenoid means for use in conjunction with a typewriter as part of a base plate for the typewriter, wherein the unique switches and solenoids enable the base plate to be operatively connected to, and removed from the typewriter in a minimum time, by virtue of the fact that the solenoids and switches do not require any interconnection with typewriter components.

Yet another object of the present invention is to provide a unique platen and platen guide for a typewriter which, when made part of a typewriter base plate which gives a typewriter electrical transmission and response capabilities, enables the presence or absence of paper in the typewriter to be known from a remote location.

Further and more specific objects and advantages of the present invention are made apparent in the following specification wherein a preferred form of the invention is described by reference to the accompanying drawings.

In the drawings:

FIG. 6 is similar to FIG. 5 but taken along the line 6—6 of FIG. 3;

FIG. 7 is an exploded isometric view of a solenoid modified as taught by the present invention;

FIG. 8 is an isometric invention of the tabulator mechanism of the present invention together with a base plate solenoid and switch;

FIG. 10 is an isometric view of the typewriter case shift mechanism together with a base plate solenoid and base plate switches;

FIG. 11 is an isometric illustration of a portion of the typewriter tab set and tab clear mechanism together with base plate components.

Figure 1:
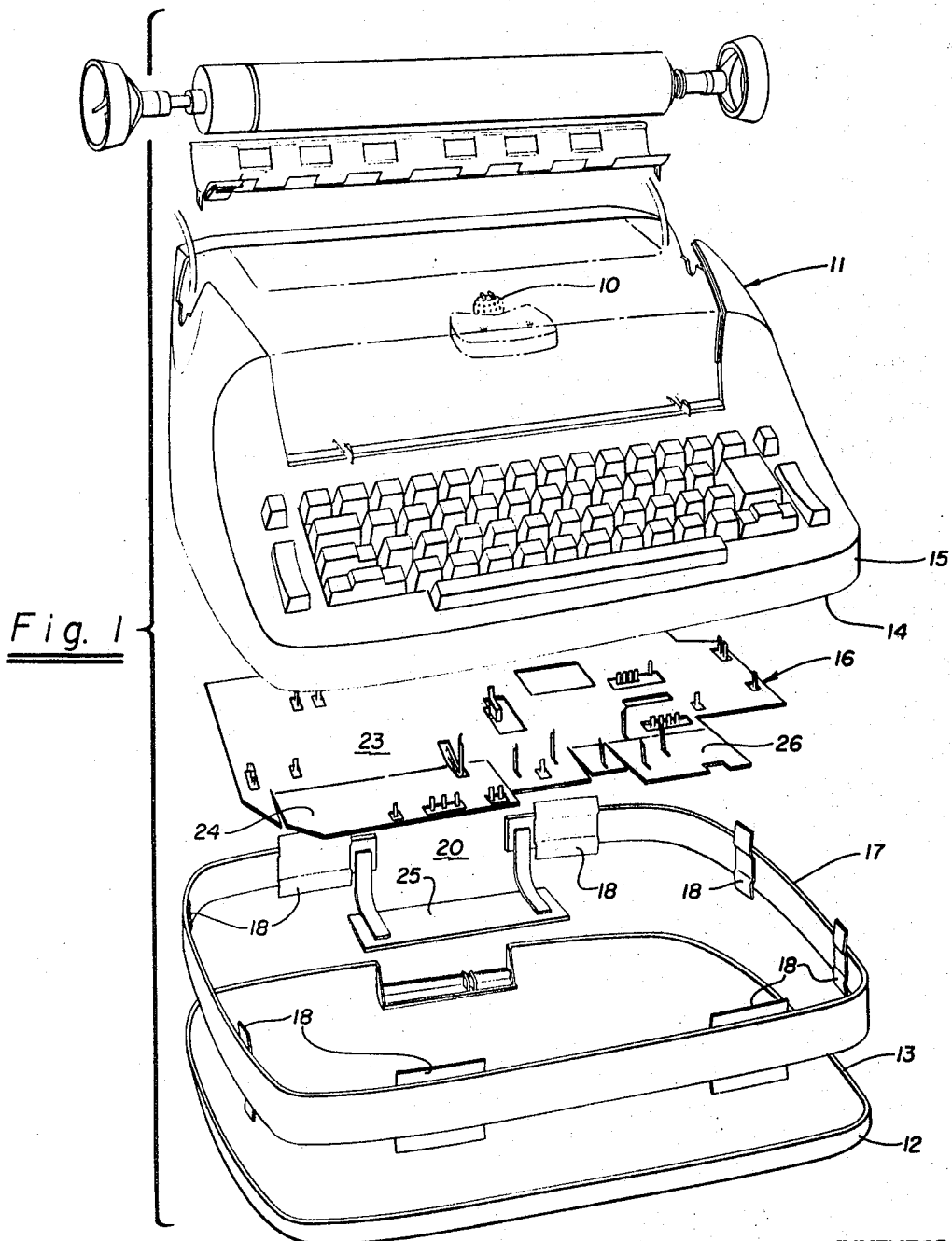
FIG. 1 is an exploded isometric illustration of a typewriter outfitted with the base plate of the present invention.

Referring now to FIG. 1, a typewriter 11 represents a standard, production-line IBM Selectric typewriter without special cams or internal modifications. This typewriter is characterized by the presence of a generally spherical golfball-like writing head 10 as opposed to typing bars, and is designed exclusively for the preparation of written material, and does not have any capabilities for responding to electrical signals or generating electrical signals during its operation. The bottom of the typewriter 11 is closed by a bottom cover pan 12 the upper perimeter 13 of which normally bears against the lower edge 14 of the typewriter case 15 and is secured thereto by suitable means such as friction clips (not shown). When disposed for operation, the base plate 16 of the present invention is secured at the bottom of the typewriter 11. Since the base plate (which includes solenoids and switches) has a thickness which is greater than the space normally present between the bottom of the typewriter and the bottom cover pan, a spacer band 17 is interposed between the bottom cover pan 12 and the typewriter case 15 to provide additional space for the base plate. Thus, when the base plate 16 is secured to a typewriter giving the typewriter data read-in and read-out capabilities, the typewriter can be physically distinguished from a similar typewriter without the base plate of the present invention by the presence of the spacer band 17 (approximately one inch in height). The spacer band 17 is secured to both the bottom of the typewriter case 15 and the bottom cover pan by means of spring clips 18 which enable the band to be easily and quickly secured to, or removed from a typewriter.

The band 17 has a space 20 to accommodate a plug which must be accessible from the exterior of the typewriter in one embodiment of the invention. To give the band 17 needed rigidity and shape continuity, a bridge 25 connects the ends of the band which define space 20.

One of the outstanding features of the present invention is the arrangement of all of the necessary individual components onto a single mounting plate. This feature enables the typewriter to have expanded capabilities by the attachment of a single base plate mechanism as opposed to the attachment of numerous unconnected and physically unrelated devices as is presently the practice in the art. As will be pointed out in greater detail below, the single base plate mechanism can be attached and replaced in a fraction of a minute without disturbing the precise adjustment which exists between typewriter components and base plate actuators and sensors.

Figure 2:
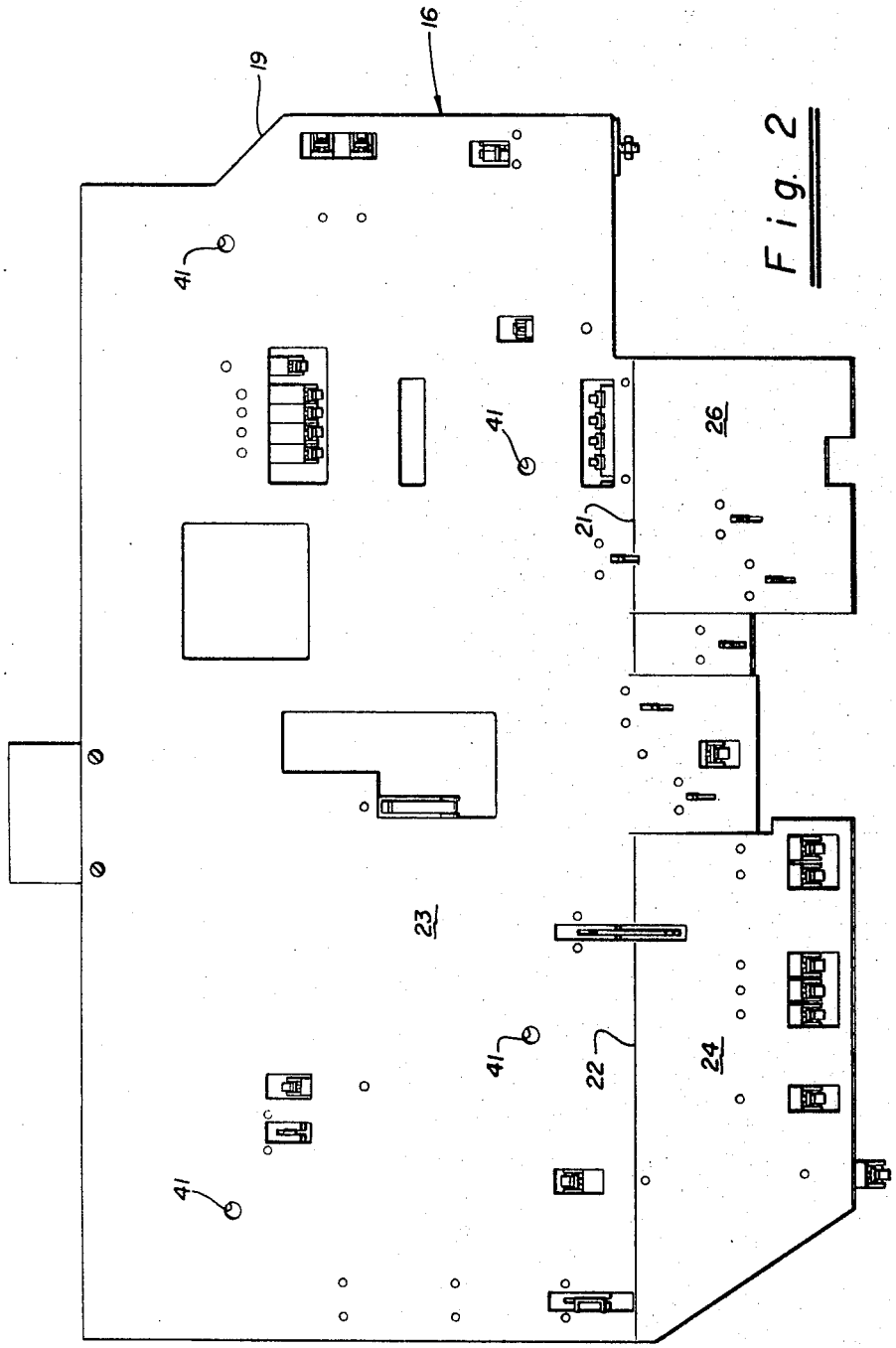
FIG. 2 is a plan view of the side of the base plate of the present invention which faces the typewriter when operatively attached thereto.
Figure 3:
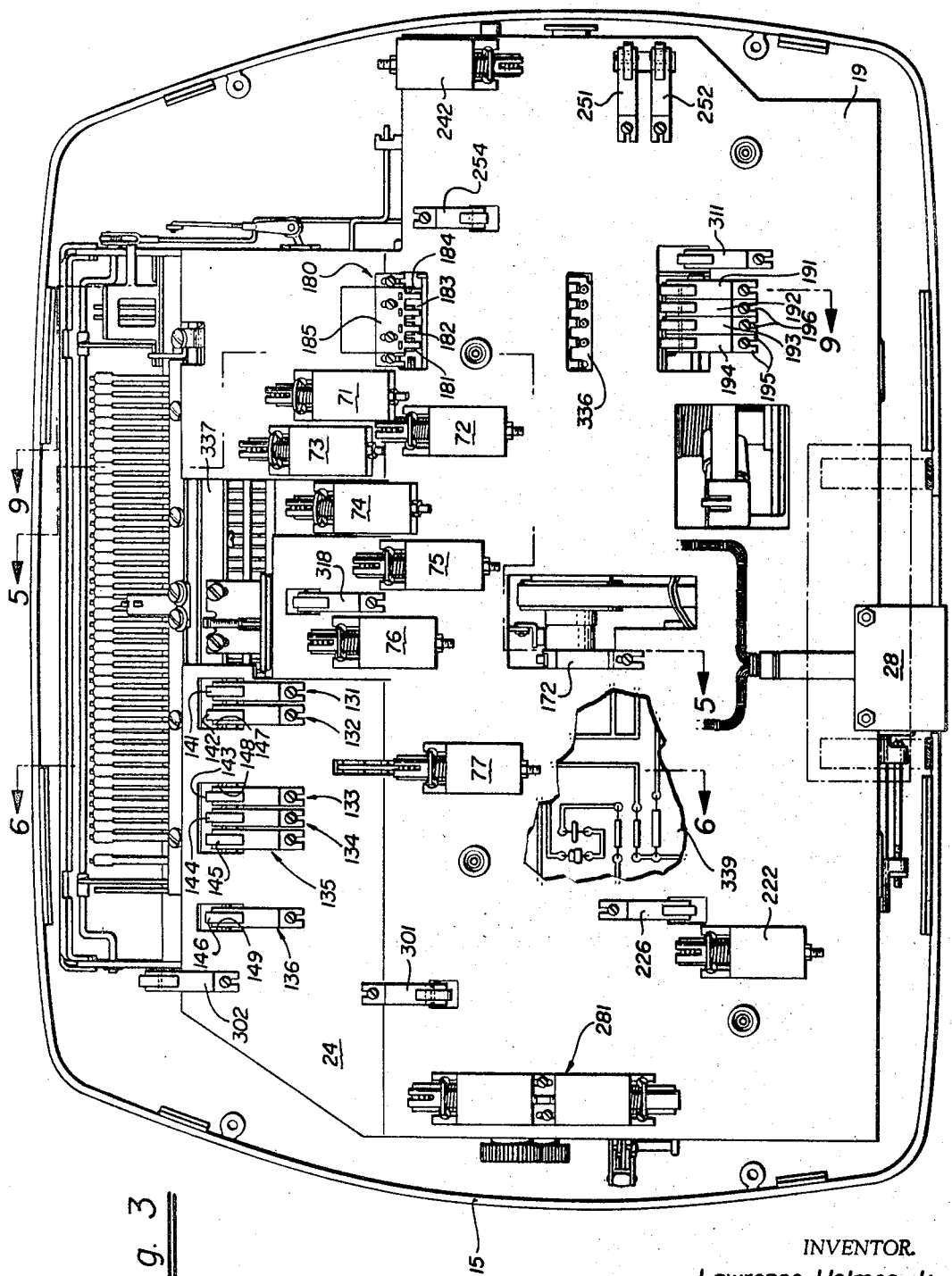
FIG. 3 is a bottom plan view of a typewriter (without bottom cover pan) with a base plate of the present invention attached thereto.

Referring now to FIG. 2, the base plate 16 of the present invention includes a generally rectangular flat mounting plate 19 preferably formed from a metallic material, divided by score lines 21 and 22 into a main mounting portion 23, and two smaller mounting portions 24 and 26 which are disposed at a slight angle (e.g. 15°) with respect to the main portion 23 to which switches and solenoids are mounted to form the base plate. The angular relationship between the main portion 23 and the smaller portions 24 and 26 follows the contour of the underside of the typewriter whereby the mounting plate makes available for mounting components all of the space between the typewriter and bottom cover pan. As best seen in FIG. 3, the dimensions of the mounting plate 19 are largely determined by the lower peripheral dimensions of the typewriter casing 15 since the most advantageous placement of the base plate is within the confines of the typewriter case.

Mounted on the convex side of the mounting plate 19 (the side which is accessible from the bottom of the typewriter when the base plate is attached) are a plurality of solenoids and switches, the structural details of which will be described in greater detail below. All of the switches and solenoids have actuator arms which extend through openings in the mounting plate and extend outwardly from the concave side of the mounting plate (the side which faces the typewriter components when the base plate is attached). When the base plate is secured to a typewriter, the actuator arms of the solenoids and switches extend up into the typewriter mechanism (FIG. 3 being a bottom view of the typewriter with a base plate secured thereto), to locations adjacent the typewriter components which they operate or sense. As will be explained in greater detail below, the proper selection of locations for the various solenoids and switches enables the base plate to be placed onto the typewriter without any interference from typewriter components, and without the requirement that any of the actuator arms of the switches and solenoids be connected to components of the typewriter. In other words, the actuator arms of the switches and solenoids extend up through spaces between typewriter components to positions which enable them to perform the function for which they are intended, without interfering with the normal operation of the typewriter.

Although not shown, all of the switches and solenoids have electrical conductors which terminate at a plug 28 which is accessible from the back of the typewriter to enable the various solenoids and switches to be electrically joined to a computer or other control circuitry for either operating the typewriter or supplying information written by the typewriter.

The ability to index all of the separate solenoid actuating arms and switch actuator arms simultaneously is one of the most outstanding features of the present invention. It is the unitary mounting plate concept which gives the present invention this unique ability. The mounting plate precisely locates all of the switches and solenoids relative to one another and relative to indexing means provided on the mounting plate. Once a switch or solenoid is attached to the mounting plate it is automatically indexed with respect to the typewriter component it operates or senses when the mounting plate is secured to the typewriter. Thus, instead of attaching the solenoids and switches directly to the typewriter as is the practice with presently available input/output typewriters, the present invention attaches only the mounting plate to the typewriter. This eliminates all of the problems involved in accurately mounting each component within the typewriter and also eliminates the necessity of adjusting the placement of each component every time it is removed and replaced. In the present invention every single one of the sensing and operating components can be removed and replaced simultaneously in a fraction of a minute without disturbing the fine adjustment of the components.

Figure 4:
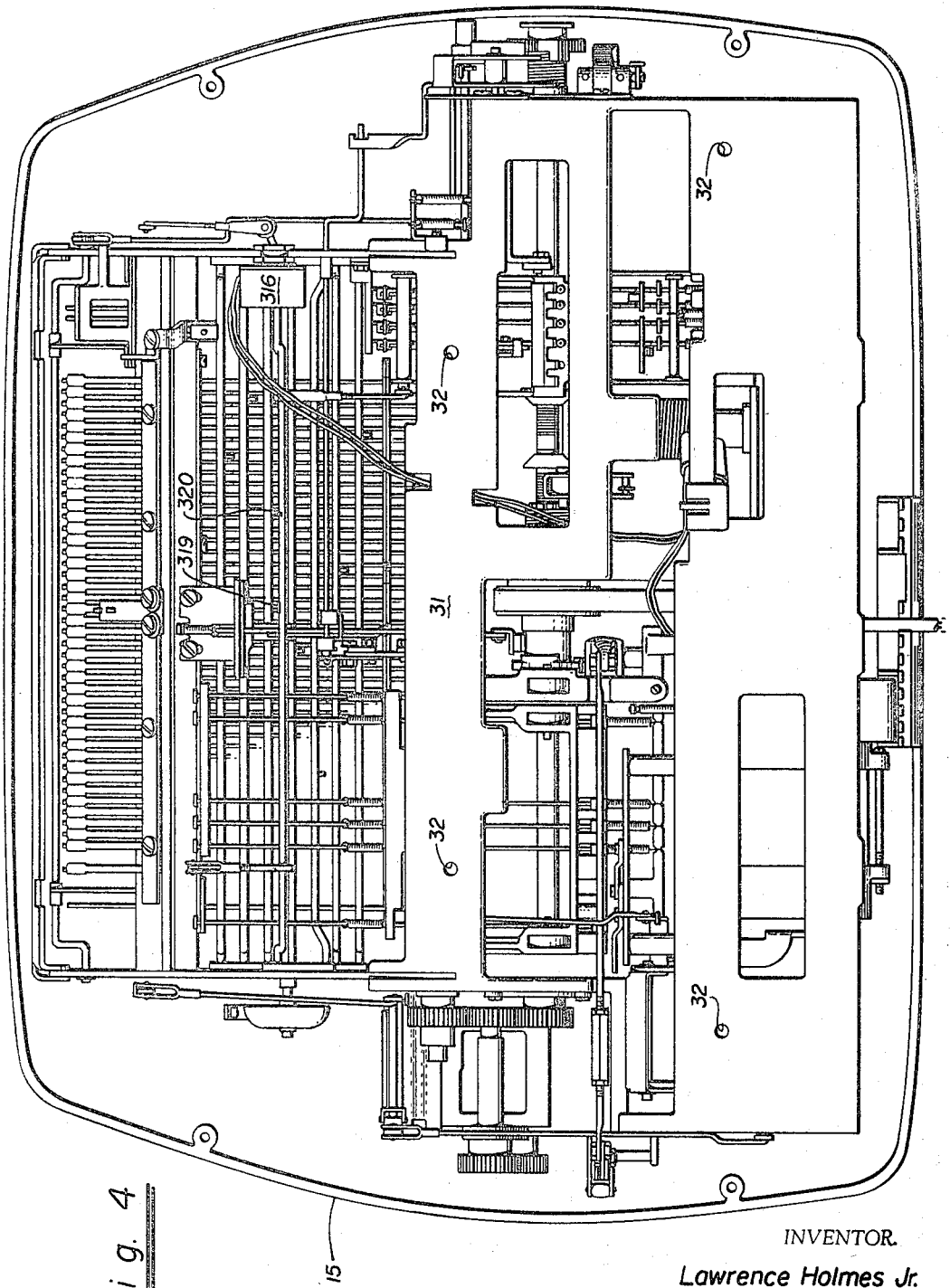
FIG. 4 is a bottom plan view of a typewriter.

Referring to FIG. 4, the main frame 31 of every IBM Selective typewriter includes four accurately located threaded holes 32 which can be advantageously employed as indexing means to accurately dispose the base plate with respect to the components of the typewriter. These threaded holes 32 are used first in securing the typewriter during shipment, and later for receiving the threaded bolts (not shown) of typewriter feet 43 (see FIG. 5) which exend to or slightly through holes 33 in the bottom cover pan 12. Feet 43 support the typewriter during maintenance and repair when the bottom cover pan 12 is removed. The feet 34 which normally support the typewriter are attached to cover pan 12 thus requiring the ancillary feet to protect the typewriter components from being subjected to the weight of the typewriter during maintenance and to protect the desk top from damage while the typewriter is slid about during maintenance and repair. In order to make the holes 32 available for use with the base plate, it is necessary to remove the feet 43 so that the holes 32 are unoccupied. The base plate indexing means includes a stud 36 which is divided into an upper portion 37 and a lower partially threaded portion 38 by an integral flange 39. The upper portion 37 of each stud is threaded into one of the holes 32 whereby the resulting depending studs 38 are accurately located members to which the mounting plate can be affixed. The portion 37 is threaded into holes 32 until the flange 39 is urged tightly against the frame 31. The thickness of flange 39 is carefully maintained (e.g., fifty-thousandths of an inch) to accurately space the mounting plate 19 from the frame 31 to accommodate any screw ends or protrusions which may exist on the frame and, at the same time, accurately set the longitudinal position (depth to which arm extends into typewriter) of the actuator arms of the various base plate solenoids and switches.

The base plate is secured to the typewriter by passing the four studs 38 (only one of which is shown on FIG. 5) through four indexing holes 41 (see FIG. 2) in the mounting plate 19. Matching the holes 41 with the studs 36 (the ends of which are tapered to aid in starting) accurately aligns the base plate with the components of the typewriter, whereby the actuator arms of the solenoids and switches pass between the components of the typewriter and properly align themselves with respect to the components which they are to sense or operate.

In order to prevent damage to the typewriter it is essential that the various actuator arms be inserted into the correct, predesignated typewriter spaces. It is also important to prevent misalignment during attachment of the base plate to avoid unusual forces from being placed on the actuator arms since such forces could cause deformation and subsequent malfunction. In the present invention the portion 38 of each indexing stud 36 makes it impossible to incorrectly insert any of the actuator arms into the typewriter. The stud portions 38 are of such length as to engage the indexing holes 41 prior to any of the actuator arms entering the typewriter mechanism. Thus, if the base plate is not properly aligned with a typewriter, the studs will not enter the indexing holes and will contact the mounting plate preventing further movement of the base plate toward the typewriter. When the studs enter the indexing holes, proper alignment is established and further movement of the base plate toward the typewriter is possible.

The angular relationship between the main portion 23 of the mounting plate 19 and the smaller portions 24 and 26 (see FIG. 5) causes the edges of these smaller portions to contact a fixed member 42 of the typewriter (key lever leaf spring mounting member) just prior to the main mounting plate 19 contacting the flange 39. Thus, when the main portion 23 of the mounting plate 19 is urged tightly against the flange 39, as by threading the cylindrical feet 43 onto the lower portion 38 of the stud 36, the smaller portions 26 and 24 of the mounting plate 19 are caused to flex slightly. This flexing action insures that the smaller portions 24 and 26 of the mounting plate 19 are held rigidly in place without requiring securing means other than the four studs 36 and cooperating nut members, such as feet 43. Once the feet 43 have been secured in place, the ring 17 is snapped onto the typewriter case 15 and the bottom cover pan 12 is snapped onto the ring 17 completing the entire installation of the base plate. With the base plate so installed the typewriter has the added capabilities of operating in response to electrical signals and producing electrical signals to identify its operation. The plug 28 makes all of the solenoids and switches forming a portion of the base plate electrically accessible from the exterior of the typewriter, thus making it unnecessary to remove the bottom cover pan 12 except for purposes of maintenance and repair.

When the typewriter needs to be cleaned or otherwise serviced, as is periodically necessary, the base plate is removed by simply removing the bottom cover pan 12, unscrewing the four feet 43 and withdrawing the base plate from the typewriter. To protect the typewriter and prevent scratching the desk, the feet 43 are again screwed onto studs 36. The typewriter is then in the most advantageous condition for service or repair as there is no interference from those components which give the typewriter the expanded capabilities of data read-in and read-out. Since there are no interconnections to be made between base plate components and typewriter components, the removal and replacement of the base plate by a typewriter serviceman in no way significantly increases the burdens of preparing the machine for service (removing the base plate is as easy, if not easier, as removing the bottom cover pan) and does not require that the serviceman be specially trained. Thus, the manner of mounting and securing solenoids and switches necessary to give a typewriter the expanded operational capabilities for which the present invention is designed, provides a significant advantage over the prior-art devices wherein the switches and solenoids are semi-permanently mounted within and on the typewriter on individual brackets which cannot be easily and quickly removed from the typewriter each time the typewriter needs to be serviced. Thus, service of a prior-art typewriter equipped for data read-in and read-out requires specially trained servicemen, and requires significantly more time than would be necessary on a typewriter without expanded capabilities.

The base plate of the present invention, while having rather universal application as a data read-in and read-out device is especially advantageously employed in conjunction with the translator circuits disclosed in applicant's copending application for Communication System, Ser. No. 475,728 filed July 29, 1965. In this copending application applicant teaches methods and apparatus for employing an IBM Selectric typewriter as the sender and receiver of a long-distance written communication system. In the aforementioned patent applictaion there is a detailed description of the operation of an IBM Selectric typewriter explaining the movement of various components of the typewriter during the printing of a character or operation of a function (space, black-space, carrier return, etc.). In view of the fact that the operation of IBM Selectric typewriters is well known in the art and a relatively detailed teaching of the operation of the Selectric typewriter is presented in the aforementioned patent application of applicant, it is not necessary to describe the operation of the various components of the typewriter in this teaching for a complete understanding of the present invention. Where typewriter operation is important, it is described in general terms.

Before describing the individual switches and solenoids which comprise a base plate of the present invention, a very important feature, as best seen in FIG. 3, will be pointed out. All of the solenoids and switches include mounting means (to be described in detail below) which affix the several components to the mounting plate. Without exception, all of the mounting means are operated from the convex side of the mounting plate which makes them all easily accessible from the bottom of the typewriter when the base plate is attached. This is extremely important since the mounting means are all adjustable on the mounting plate to enable fine adjustment of the location of the individual components. Thus, the fact that a base plate has been mounted does not prevent component adjustment as is the case in some prior-art devices. Further, the solenoids together with their mounting means, are all accessible when the base plate is attached whereby adjustment of the solenoid stroke is possible with the base plate attached (solenoid stroke adjustment will be described in detail below).

The advantages of being able to adjust the positions of the various components, and the stroke of the solenoids from the bottom of a typewriter while they are operatively disposed on the typewriter are sufficiently obvious not to require extolment. What is not so obvious, however, is the unique ability of the present invention to be accurately adjusted while detached from a typewriter. As previously mentioned, the removal of the base plate from a typewriter does not disturb fine adjustments. Thus, during manufacture the completed base plate can be placed in a jig which simulates to the extent necessary a typewriter for which the base plate is designed, and the individual components adjusted with respect thereto. The base plate is then in condition for immediate operation. By making it possible to perform fine adjustmens as part of the manufacturing process rather than part of the installation procedure, most of the problems of attaching a base plate in the field are eliminated which reduces the ultimate cost to the user and also produces a more reliable device.

Figure 5:
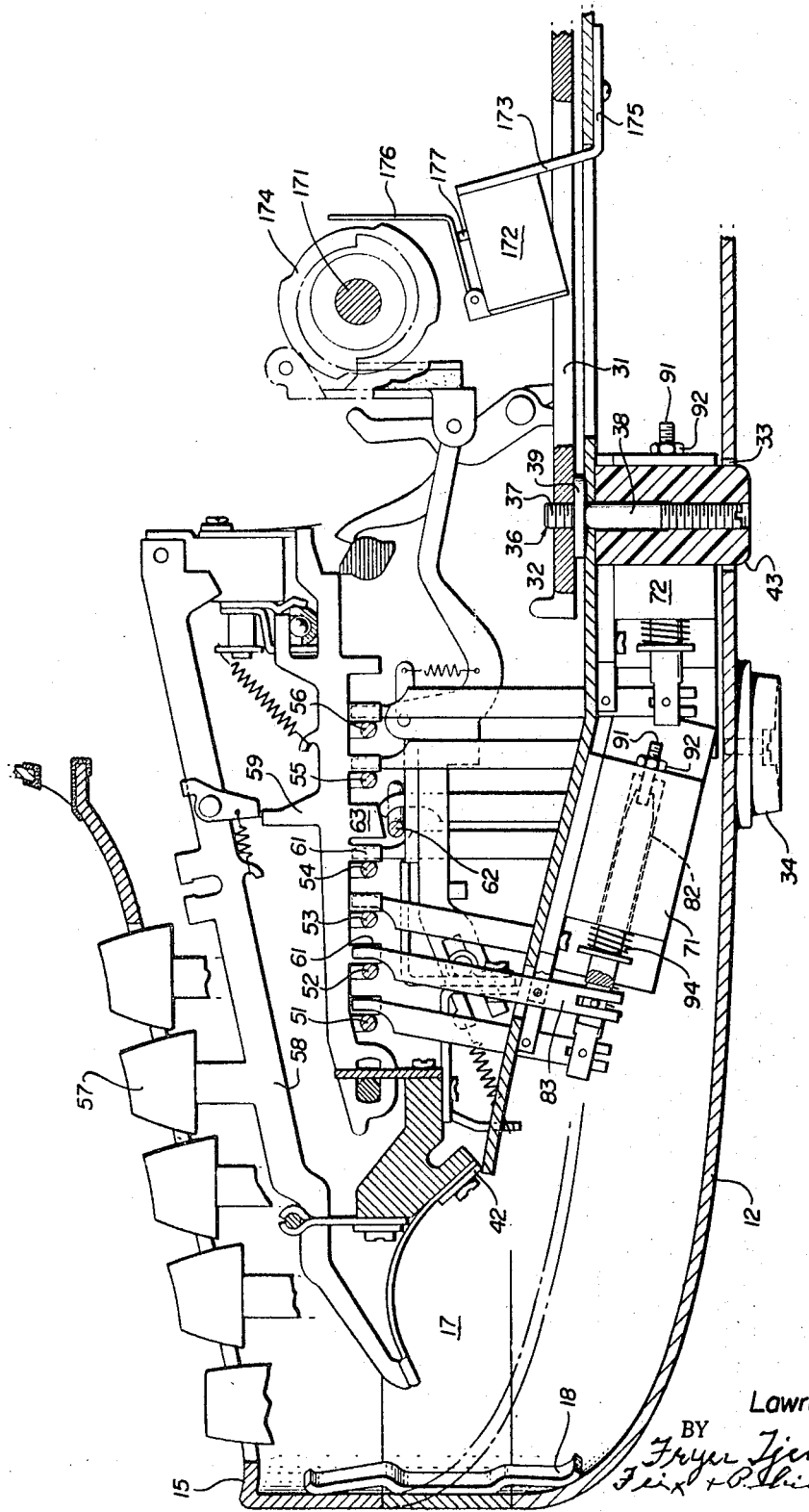
FIG. 5 is a sectional side view of a typewriter with the present invention attached thereto taken along the line 5—5 of FIG. 3.

Referring now to FIGS. 3 and 5, the typewriter mechanism includes six selector bails 51–56 through which the selection of a particular symbol (character, number, etc.) is made for printing. When a key button 57 is depressed the key lever 58 with which it is associated is urged downwardly which results in movement of an interposer 59 in the direction of the front of the typewriter (leftwardly as shown on FIG. 5). Each interposer associated with a key lever includes one or more interposer lugs 61 which operate an associated selector bail as the interposer moves in response to depression of a key button. (The interposer is actually driven forward as the result of the cycle clutch operation.) Depending on the number of lugs and the location of the lugs, a different combination of selector bails is operated each time a different key is depressed, whereby the movement of selector bails uniquely identifies a particular symbol to that portion of the typewriter mechanism (not shown) which responds to selector bail movement by positioning the type head 10 (see FIG. 1) for printing a symbol.

In addition to the movement of one or more selector bails 51–56, the depression of a key button 57 also results in the operation of a cycle clutch bail 62 which starts the typewriter cycling to print the selected symbol. While the number and location of interposer lugs 61 varies from interposer to interposer (and is different for each interposer) all interposers have a downwardly extending clutch release lug 63 which operates the clutch release bail 62 each time an interposer is operated by the depression of a key button. Thus, the operation of the typewriter in printing a selected symbol is initiated by movement of a particular combination of selector bails (except for the one symbol identified by no selector bail movement) plus the operation of the clutch release bail 62.

In order to provide the typewriter with the capability of printing selected symbols in response to electrical signals, the base plate 16 includes six selector bail solenoids 71–76 and a cycle clutch solenoid 77 (see FIG. 3). By energizing a particular combination of selector solenoids 71–76 (including energizing none of the solenoids) plus the cycle clutch solenoid 77, the typewriter is operated to print a selected symbol in precisely the same manner as if the interposer associated with that combination of selector bails had been moved in response to depression of its associated key button.

The selector solenoids 71–76 are disposed on the mounting plate 19 at locations which assure that their actuator arms have unobstructed paths to positions adjacent selector bails whereby the base plate can be affixed to and made a part of the typewriter without requiring removal of typewriter components or the use of special tools. The location of the cycle clutch solenoid 77 also allows the actuator arms thereof to be positioned at the necessary location without special attention. Since the location of the solenoids and their associated actuator arms is extremely important both for the proper operation of the typewriter by the solenoids, and also to avoid any interference with normal typewriter operation by the solenoid actuator arms, the solenoid mechanisms are adjustably mounted on the plate 19 to enable fine adjustment of the location of solenoid actuator arms with respect to selector bails. In addition, the solenoid mechanisms are of a unique design to enable easy adjustment of the solenoid stroke to insure proper operation of a selector bail or the clutch release bail in response to solenoid energization. The solenoid mechanism is designed to take the greatest advantage of solenoid plunger speed, its resultant inertia, inertia transfer to the typewriter selector bail and maximum solenoid power at the most crtical and heaviest bail-load point.

Referring now to FIGS. 5 and 7, each of the solenoids 71–76 is comprised of an enclosed coil 81 which surrounds a plunger 82 and which when energized induces the plunger to move longitudinally until it bottoms, plus an actuator arm 83 secured at a bifurcated end 97 of the plunger 82 which extends outwardly from the coil housing 86. Secured as by screws 87 to a surface 84 of the casing 86 is a mounting bracket 88 which serves to adjustably mount the solenoids to the mounting plate 19, and also provide a fixed pivot point for the actuator arm 83. A pair of open-ended slots 89 in one end of mounting bracket 88 receive screws 90 which anchor in threaded holes in the mounting plate 19 as best seen in FIGS. 2 and 3. These screws 90 secure the bracket 88 and thus the solenoids to the mounting plate, but allow longitudinal movement of the solenoids within the limits of the slots 89.

The other end 85 of the plunger 82 has secured thereto a threaded stud 91 which extends out of the case 86 where it receives a friction nut 92. A portion of the bifurcal end 97 of plunger 82 is surrounded by a spring 94 which is held in compression between the casing 86 and a clip 96 which is affixed on the plunger 82. The spring thus provides a force which operates to urge the plunger away from the case, which is also away from its bottom position. The distance which the spring is able to drive the plunger out of the casing is limited by the nut 92 engaging the end of the coil case. Thus the rest (unenergized coil) position of the plunger is adjustable through the action of nut 92, which is used to optimumly adjust for timing, solenoid pull power, plunger stroke length and actuator arm position.

The actuator arm 83 is pivotally secured at its lower end to the plunger 82 by a pin 98 which bridges the bifurcated end 97 of the plunger and passes through an open-ended slot 99 in the lower end of the actuator arm. The open-ended slot 99 facilitates fast assembly and permits necessary sliding action against pin 98 to accommodate the arc described by arm 83. The mid-portion of the actuator arm is pivotally joined within an open-ended slot 101 in bracket 88 by a pin 102 which spans the slot and passes through a hole 103 in the actuator arm. Thus, longitudinal movement of the plunger 82 results in pivotal movement of the actuator arm 83 about pin 102. Accordingly, once the base plate is secured to a typewriter, fine adjustments of the actuator arms 83 can be made by positioning the nuts 92 which are all easily accessible from the bottom of the typewriter. It should be pointed out, however, that it is not necessary for each solenoid to be adjusted and, in the majority of instances the location of nut 92 in some predetermined position on stud 91 will result in proper positioning of the actuator arms 83 in their unenergized position, such that adjustment of each nut 92 is not a necessary operation in adapting a base plate of the present invention to an IBM Selectric typewriter.

As best seen in FIG. 5, when the solenoid 71 is energized, the plunger 82 moves toward its bottom position and is drawn into the case 86 (causing the stud 91 to extend further out of the case) which results in the counterclockwise rotation of the actuator arm 83 of solenoid 71, and thus contact between the actuator arm and its associated selector bail 52. As the actuator arm continues its movement its associated bail is driven toward the front of the typewriter case in precisely the same manner as if the bail had been engaged by the stud of an interposer which had been urged into operation. The preferred adjustment of nut 92 on stud 91 is that which locates the actuator arm at a slight distance from its associated bail when the arm is in its rest position. With this adjustment the actuator arm can move a short distance without a load so as to build up momentum before it strikes the bail. This starts the bail load which is pulled the rest of the way as the solenoid plunger approaches the bottom position. In this way the heaviest load occurs at the time of maximum plunger pull whereby maximum solenoid efficiency is employed. Because of this highly efficient arrangement, relatively small solenoids can be used which reduces the space necessary between the typewriter and its bottom cover pan. The actuator arms 83 are formed to have a generally broad main body portion 83a (see FIG. 7) which gives the arm strength and prevents flexing so that there is an immediate transfer of kenetic energy from the plunger to the bail at the start of the stroke and later in the stroke there is immediate transfer of solenoid pull force to the bail. The actuator arms also include a narrower contacting portion 83b which is sufficiently narrow to allow the bail behind it to be operated without obstruction from an actuator arm and without operating the bail in front of it. It is preferable for the angle of the bail contacting surface 83c to be vertical with respect to the bottom of the typewriter and yet the slot 99 should be vertical to the axis of the plunger. Therefore, the arms of solenoids mounted on the main portion 23 of the mounting plate have contacting surfaces 83c which are parallel to the axis of the actuator arm itself; those actuator arms associated with solenoids mounted on the angularly disposed smaller mounting plate portions 24 and 26 have contacting surfaces which vary from the axis of their actuator arms by an angular amount equal to the angle between mounting plate portions.

The cycle clutch bail 62, unlike the selector bails 51–56, is operated by downward vertical movement. In order to induce this movement of the cycle clutch bail 62, a special actuator arm 107, as best seen in FIG. 6, is associated with cycle clutch solenoid 77. Instead of the straight actuator arms as used in conjunction with solenoids 71–76, solenoid 77 is associated with an actuator arm 107 having a vertical portion 107 disposed to contact the bail 62, a vertical portion 109 which is pivotally joined to the solenoid plunger 111 and mounting bracket 112, and a generally horizontal portion 113 connecting the two vertical portions.

To avoid the necessity of the actuator arm 108 either interconnecting to a typewriter component or hooking over bail 62, the end 114 includes an arcuate surface 116 which operates to engage the bail 62 and move it downwardly in response to energization of the solenoid. This arrangement permits the arm end 114 to clear bail 62 while the solenoid 77 is unenergized such that the arm end 114 and bail 62 do not interfere with each other while the base plate is being positioned up or down over the indexing studs, 36, and, yet the arc described by end 114 eliminates the clearance and in combination with arcuate surface 116 serves to pull down on bail 62 when solenoid 77 is energized. Thus, the unique configuration of arm 108 together with the manner in which it is pivotally mounted enables in energization of solenoid 77 to produce a generally vertical downward movement of bail 62, and thus accurately simulates the movement of bail 62 in response to manual operation of the typewriter. As previously mentioned, the solenoid 77 is identical with the solenoids 71–76 with the exception of its actuator arm, and thus the initial positioning of the actuator arm is also adjustable through nut 92.

Referring to FIG. 6, each of the selector bails 51–56 is associated with a latch interposer 121 (only one of which is shown). Each latch interposer 121 is associated through a connecting rod 123 with a latch 124 which is normally retained under a bail 126. When a particular selector bail has been operated, it causes the latch interposer with which it is associated, to move leftwardly (as shown in FIG. 6) withdrawing its associated latch 124 from beneath the bail 126, whereby subsequent downward movement of the bail in response to rotation of cam 127 does not result in that particular latch being urged downwardly. The particular symbol printed is a function of the combination of latches 124 (if any) pulled down with the bail 126 in response to rotation of cam 127. By identifying the particular latch interposers 121 which move leftwardly during any single printing cycle, all of the information necessary to know the particular symbol which has been selected for printing is furnished. Thus, the base plate 16 of the present invention includes six switches 131–136 (see FIG. 3), each of which is associated with one of the latch interposers 121. The basic switches 131–136 are preferably either form B (normally closed) or form C (1 normally closed and 1 normally open), enclosed cricket switches (e.g. Licon Type 19) modified in a manner to be described below and are secured on the portion 24 of plate 19 with their actuator arms 141–146, respectively, extending through openings 147, 148 and 149 so as to reach up into the typewriter mechanism when the base plate is mounted on the typewriter. The actuator arm of each switch 131–136 extends into the typewriter to a location immediately adjacent that end of its associated interposer 121 which is closest to the front of the typewriter (leftwardly most end as shown in FIG. 6), whereby the leftward movement of the interposer in response to operation of the interposer's associated selector bail, is detected by operation of the switch. Thus, the condition of the six switches 131–136 precisely identifies the particular symbol which has been selected for printing, whereby the typewriter operates to generate an electrical signal (establish an electrical condition) which identifies the particular one of the several key buttons which has been depressed.

As mentioned above, the switches 131–136 have been modified to establish a unique switch having the characteristics necessary for proper operation in the environment of the present invention. Generally speaking, an unmodified, encased cricket switch (or microswitch) mechanism is operated by a button which extends outwardly from the case, and which is, in certain instances, depressed by an actuator arm pivotally connected to the switch case. In its normal condition the button is not depressed, and operation of the switch occurs by causing the switch actuator arm to be pivoted toward the switch case and thereby depress the button. This is true whether the switch is a normally open switch or a normally closed switch. In its unmodified form, a switch has disadvantages as far as the present invention is concerned, in that the switch does not change its condition to identify the movement of a typewriter component until its actuator arm has been completely rotated and the switch button almost fully depressed. Further, an unmodified switch would have to be very accurately positioned with regard to a moving member, in that if the member did not rotate the actuator arm a sufficient distance the switch would not operate, and if the actuator arm rotated too far it could drive the switch button beyond allowable overtravel and damage the switch. Thus, an unmodified cricket switch does not generate the information desired until late in the stroke of the typewriter component being sensed, and requires very precise and stable positioning in order to assure operation and prevent damage to the switch. The present invention teaches a cricket switch which has been so modified as to operate at the beginning of the stroke of the typewriter components, such that the desired information is generated early in the typewriter cycle, and the switch actuator arm cannot drive the switch into damaging overtravel.

The modifications taught by the present invention which provide the superior operating characteristics mentioned above are best seen with reference to FIGS. 6 and 11 wherein modified switches are employed. Secured along one edge of every modified switch is a bracket 151 having an end 150 which extends slightly over the edge 152 of the side of the switch through which the switch button 153 extends. The bracket extends over the opposite edge of the switch a distance equal to approximately half the width of the switch, and has an open-ended slot 154 formed therein. The slot 154 receives a screw 156 which threads into a hole in the mounting plate 19, whereby the switch is secured to the mounting plate and is adjustable along the longitudinal axis of the bracket 151 within the limits of the slot 154. Disposed on the edge opposite to that to which the bracket 151 is secured is a spring 157 which bears against the actuator arm 143 causing it to be held against the bracket end 150 with a light spring force. The length of bracket end 150 is sufficiently short to allow the switch button 153 to operate when the spring 157 holds the actuator arm thereagainst. By virtue of the modifications described above, a normally open switch becomes a normally closed switch, and a normally closed switch becomes a normally open switch since the spring 157 causes the switch to be operated (the actuator button depressed) when the switch is unacted upon by an external force.

The switch 133 is disposed on the mounting plate 19 in such an orientation that the leftward movement of latch interposer 121 causes the switch actuator arm 143 to experience a force which opposes the force of spring 157. As the actuator arm moves away from the switch casing in response to this force, the button 153 is released and the switch is thereby operated. Since the switch operates after a very short travel of the button 153 from its fully depressed position, the operation of the switch occurs at the initial portion of the latch interposer movement and the desired information is obtained at the earliest possible time. In the case of the latch interposer, it is essential that information be obtained early in the cycle since the latches are released and start return to home position at 20° of the cycle clutch operation. Thus, the latch interposer switches must operate prior to the cycle clutch switch's release at 20° (it having been operated near the beginning of the print cycle).

As the latch interposer continues its movement leftwardly, the actuator arm 143 is rotated further away from the switch casing, but cannot be driven beyond allowable overtravel since the switch button 153 is being released and not depressed. Thus, the positioning of the switch 153 with respect to an interposer is not nearly as critical as if the switches were used in their conventional manner. When an interposer 121 moves rightwardly towards its normal position, the force of spring 157 causes the actuator arm 143 to return to that position which causes the actuator button 153 to be depressed. The switch cannot be driven into damaging overtravel by the spring, however, since the bracket end 150 acts as a stop preventing any damage to the internal switch parts.

The modifications taught by the present invention make it possible to use enclosed switches exclusively unlike prior-art devices which employ one or more switches with exposed contacts. By completely eliminating exposed contacts, the possibility of malfunction due to eraser crumbs interfering with switch closure is also eliminated, thus further adding to the dependability of the present invention.

As best seen in FIG. 11 the bracket 151, spring 157 and switch actuator pivot support 161 can all be integrally formed from a single metal stamping appropriately scored and bent, and attached to the switch as by screws 162.

Referring to FIG. 5, in order to sense the operation of the cycle clutch, and thus the operation of the cycle shaft 171 (the rotation of shaft 171 being operable to cause the selected symbol to be printed) a generally unmodified, isolated double-circuit switch 172 of the butterfly variety (e.g. Licon Type 16) is secured on the mounting plate 19 by an L-shaped bracket 173. The cycle clutch switch 172 is the only component which is disposed on the concave side of the mounting plate 19, but even it is secured to the mounting plate by a mounting means 175 which is operable from the convex side—the side exposed when the base plate is attached to a typewriter. Thus, adjustment of the position of switch 172 can be made while the base plate is operatively disposed on the typewriter.

The shaft 171 carries a double lobe cam 174 which rotates one-half revolution for every print operation. The rotation of cam 174 is sensed by a generally L-shaped actuator arm 176 pivotally mounted on switch 172. The arm 176 is operatively disposed adjacent cam 174 and is engaged by the cam during every half revolution movement thereof whereby the switch button 177 is depressed and the switch operated every time the cycle clutch operates and the shaft rotates in response thereto.

As mentioned above, the switch 172 is an isolated double-circuit switch. One of its circuits performs the send function of indicating that the cycle clutch has operated. The other circuit is advantageously used as part of the receive circuit as a gate to prevent information from being received prior to the time the typewriter can safely receive it, and to indiate that any information held in a memory concerned with the present operation is to be discharged. The IBM Selectric typewriter employs a type head 10 (see FIG. 1) and the head must be returned to a home position prior to being moved to a new position, or else the steel bands will break. Thus, if a signal is allowed to operate the latch solenoids before the typewriter is in condition to have the head positioned, band breakage will result. Some prior-art devices have overcome this problem by maintaining a sufficiently slow rate of information transmission to assure the receive typewriter of ample time. This is, of course, an undesirable solution as it limits the data flow to a rate well below the actual capability of the machines. The cycle clutch switch 172 informs the sending or storage device of the earliest possible time for receiving new data and thus makes it possible for the machine to operate at its maximum receive capability.

The description of the present invention to this point discloses an embodiment which is capable of both sensing and operating those typewriter components associated with the selection and printing of a symbol. While in most cases this is the preferred embodiment in that it gives a typewriter the dual capability of operating in response to electrical signals and generating electrical signals for operating a remote typewriter or computer readin-readout, the present invention is useful in an embodiment which includes only switches, or an embodiment which includes only solenoids. If a typewriter is to operate only as a receiver and in no instance as a sender, the presence of switches is unnecessary provided precautions are taken not to have signal rates exceed the cycling rate of the typewriter. It is also true that if a typewriter is to be operated solely as a sender and not as a receiver, the solenoids for operating the typewriter have no function. Thus, the present invention is not necessarily limited to an embodiment which includes both switches and solenoids; that is, sensors and operators.

As a sender typewriter is operated various combinations of interposer sensing switches 131–136 will be operated each time a print cycle is initiated, whereby an electrical condition is established which uniquely identifies that key button which has been depressed. If the sending typewriter is operatively associated with a receive typewriter, as through a translating mechanism such as that taught in applicant's aforementioned copending patent application, then the electrical condition established by the switches 131–136 in the sending typewriter will be received by the selector bail solenoids 71–76 of the receive typewriter and induce operation of those particular solenoids necessary to print the proper symbol when the cycle clutch signal is received and the cycle clutch solenoid responds thereto by initiating a print cycle.

By being equipped with both solenoids and switches, a typewriter is capable of performing as both a sender and receiver which, under most conditions, will be the desired embodiment.

Figure 9:
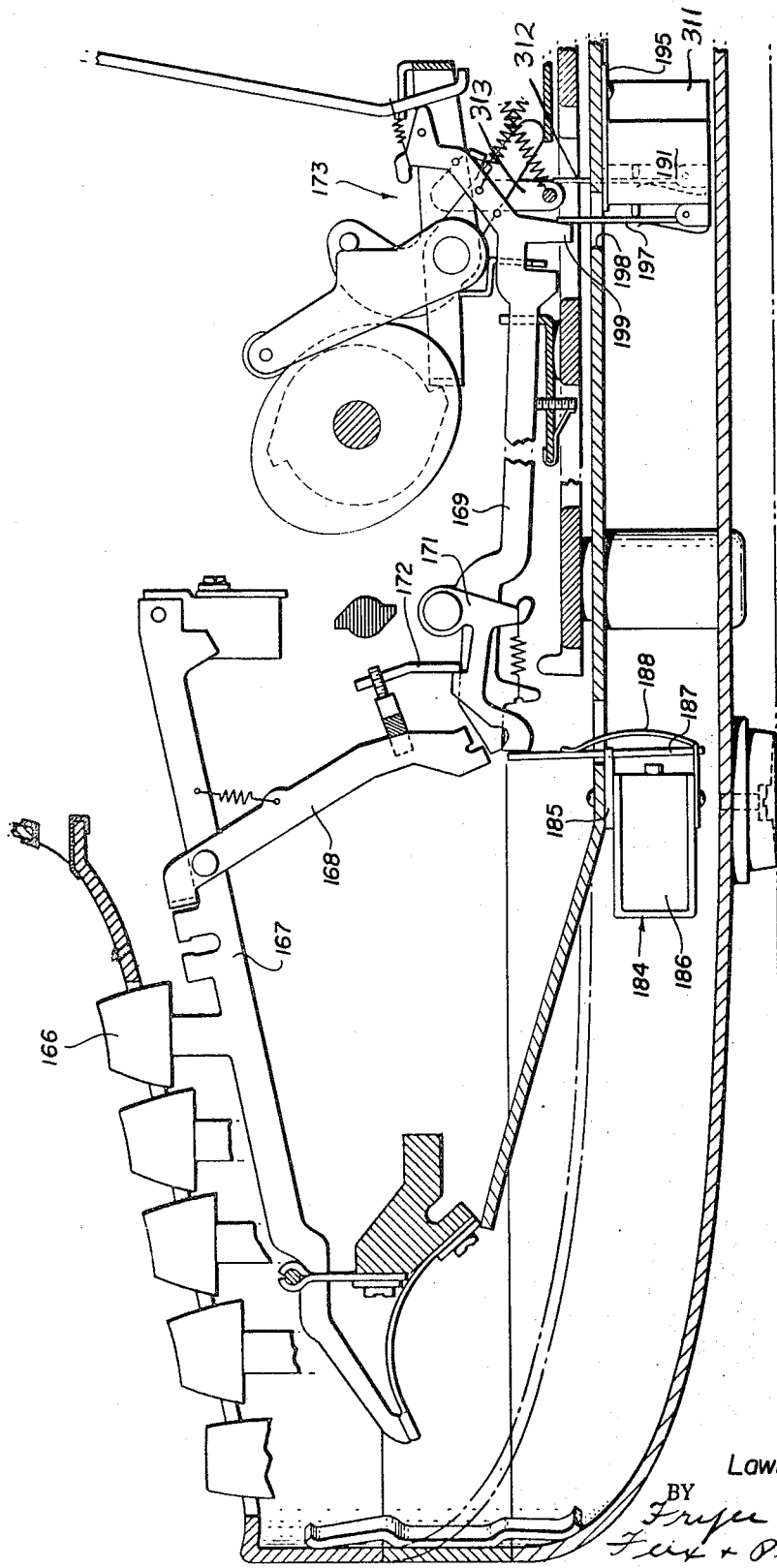
FIG. 9 is a sectional side view taken along line 9—9 of FIG. 3.

In addition to those solenoids and switches necessary for sensing and printing a particular symbol selected, it is also necessary for the base plate to provide solenoids and switches which initiate and sense those function (non-print) operations of the typewriter which do not include the printing of a symbol. Thus, each typewriter mechanism associated with a non-print operation of the typewriter has a solenoid associated therewith, which when energized, causes that non-print operation to be performed by the typewriter. Each such mechanism also includes one or more switches which sense that a particular non-print operation is occurring. The typewriter operations of space, back-space, carrier return and line feed are all performed in a similar manner, and by similar mechanism, such as that shown on FIG. 9. While there are, in fact, certain mechanical differences between the components which initiate and produce a space, back-space, carrier return or line feed operation, they all are associated with a particular key button, such as button 166 which, when depressed, causes an associated key lever, such as key lever 167 to move downwardly forcing a key lever pawl 168 to engage the end of an interposer 169 and urge it downwardly. As the interposer 169 moves downwardly, it carries with it a latch 171 which is normally operatively engaged by a stop 172. The downward movement of the latch 171 causes it to disengage from the stop 172 and enables the mechanism generally indicated at 173 to operate to perform the function corresponding to the depressed key button. Thus, a function such as space, back-space, carrier return or line feed is performed by releasing the latch 171 and is characterized by the movement towards the rear of the typewriter (rightwardly as shown in FIG. 9) of the interposer 169. There are, as mentioned, four separate latches and four separate interposers for the function operations specified above, thus requiring for the purposes of the present invention, four solenoids to initiate a selected operation, and four switches to sense the occurrence of a particular function operation. The function operations are initiated in response to electrical signals by means of a bank 180 of four clapper plate solenoids 181, 182, 183 and 184 (see FIG. 3), each of which includes a coil 186 and a pivotally mounted clapper plate 187. A spring 188 is secured to the solenoid housing, and places a small force against the clapper plate 187 (actuator arm) of the solenoid, urging it in a direction opposite to that which it rotates when the coil is energized. The solenoid bank 180 is secured on the mounting plate by a bracket 185 which enables adjustment of all four solenoids 181–184 simultaneously.

The individual solenoid actuator arms 187 extend through an appropriate opening in the mounting plate to locations adjacent to the latches 171 of the typewriter mechanisms which induce space, back-space, carrier return and line feed operations. When coil 184, for instance, is energized, the clapper plate actuating arm 187 is rotated in a clockwise direction forcing the latch 171 off of the stop 172, releasing the interposer 169 and allowing it to move rightwardly. As previously mentioned, the rightward movement of interposer 169 results in the typewriter performing the operation with which that interposer is associated. Thus the energization of a particular coil 181–184 results in the same typewriter operation as if one of the space, back-space, carrier return or line feed (index) key buttons had been depressed.

Referring to FIGS. 3 and 9, four switches 191, 192, 193 and 194 are disposed on mounting plate 19 so as to be located adjacent the mechanisms which produce the function operations of space, back-space, carrier return and line feed when the base plate is mounted on a typewriter. These switches function to sense the occurrence of a function operation and identify the particular operation being performed. The switches 191, 192, 193 and 194 are unmodified, enclosed, double circuit switches (e.g. Licon Type 18) secured to the mounting plate 19 by brackets 195 which are adjustable along the longitudinal axis of the brackets within the limits of a slot 196 in each of the brackets. The actuator arms 197 of each switch extends through an appropriate opening 198 in the mounting plate to a location adjacent a depending interposer lug 199 which, as mentioned above, moves rightwardly to initiate the function operation with which the interposer is associated. Thus, when an interposer functions to initiate an operation, it causes one of switches 191–194 to operate, thus establishing a unique electrical condition identifying that operation. While unmodified switches have been shown for use with the interposers 169, this is not to indicate that the modified switches described above in connection with the means for sensing the latch interposers, could not also be used. Since a non-print operation and not a print operation is being sensed, the need to sense the occurrence of the movement of interposer 169 at the beginning of its stroke is not as critical as in the case of a print operation where a cycle clutch switch must also be operated, thus making the use of the modified switch optional. One of the circuits of each switch operates as part of the transmit portion of the invention while the other circuits operate as part of the receive portion to indicate that a received signal has in fact operated the typewriter.

Referring to FIG. 8, the tabulator mechanism of the typewriter is operated by a key button 211 associated with a tabulator key lever 212, which when rotated about its pivot point 213 induces longitudinal movement of a connecting rod 214 secured to the key lever as by a clevis pin 216. The end of connecting rod 214 is secured to a crank lever 217 which is rotatably mounted on a shaft 218, and which carries a connecting rod 219 at its opposite end 221. The connecting rod 219 is associated with mechanism (not shown) which produces the desired tabulator operation, as is known in the art. A tabulator solenoid 222 of essentially the same construction as the previously described selector bail solenoids, is secured on the mounting plate 19 at a location which disposes its actuator arm 223 adjacent to the crank 217. When the solenoid is energized the actuator arm causes the crank to rotate on the shaft 218 precisely as if the key button 211 had been depressed. Thus, the solenoid provides a means for remotely operating the tabulator in response to an electrical signal. The isolated, double-circuit tabulator switch 226 of the modified or unmodified design previously described, is secured on the mounting plate 19 at a position which locates its actuator arm 227 adjacent a depending leg 228 of the crank 217 whereby the switch is operated each time the crank rotates on the shaft 218, whereby the operation of the tabulator mechanism is sensed, whether initiated manually or electrically.

Referring now to FIG. 10, typewriter key buttons 231 are operatively associated through linkage 232 with a crank lever 233 which is rotatably mounted on a shaft 234, and which operates to control typewriter case shift. The lever 233 includes a latch arm 236 which engages a clutch mechanism 237, which controls the position of an arm 238 which is operatively associated with the typewriter type-head (see FIG. 1) by a metal strap 239. When either of the keys 231 is depressed the lever 233 is rotated in a direction which partially removes the arm 236 from the clutch mechanism 237, allowing a shaft 241 to rotate the arm 238 and thus adjust the type-head for upper case printing. When the key buttons are released the clutch mechanism is induced to rotate the arm 238 back to its original position so that lower case typing can be resumed. A case shift solenoid 242 is located on mounting plate 19 at a position which disposes its actuator arm 243 adjacent a depending lug 244 of lever 233 such that energization of the solenoid results in the engagement of the end of actuator arm 243 with the arm 244 and rotating the lever 233 in precisely the same manner as if one of the buttons 231 had been depressed. Thus, the solenoid 242 provides a means for producing a case shift in response to electrical signals.

If solenoid 242 is of the type previously described, and has a plunger which has one position where the coil is unenergized and another position where the coil is energized, it must be continuously energized to maintain the shift mechanism in upper case. Where this would be undesirable a mechanical latching solenoid could be used, in which event an unlatching coil is necessary to retract the mechanical latch by pulsing the unlatching coil. In such an arrangement it becomes necessary to provide separate up-shift and down-shift receive signals for proper operation.

To sense case shifts a pair of case shift switches 251 and 252 of the modified variety are disposed adjacent the case shift mechanism and electrically joined in series. One of the switches is a normally open switch while the other is a normally closed switch. Switches 251 and 252 are located on mounting plate 19 such that neither switch is operated when the shift mechanism is in lower case, and such that both switches are operated when the shift mechanism is in upper case. Thus, the series circuit contains an open switch in both case conditions. Furthermore, the operation of the switches does not occur simultaneously during a shift such that both switches are closed for a brief time during a case shift. It is only during this brief time that a shift signal can pass through the circuit formed by the shift switches. The two shift switches thus identify the occurrence of a shift operation. To identify a shift signal as occurring in response to either an up-shift or a down-shift, a switch 254 is located on mounting plate 19 such that its actuator arm is disposed adjacent to the lever 233. When the shift mechanism is in lower case the switch is not operated and a signal from the circuit of shift switches 251 and 252 is directed by switch 254 in a way which identifies it as an up-shift. Similarly, a shift signal which occurs when the shift mechanism is in upper case and cycling toward lower case is identified as a down-shift by switch 254 which is in its operated state. The switch 254 is also useful to identify the fact that the typewriter has been locked in upper case by locking key button 253.

Referring now to FIG. 11, a typewriter key button 271 is mounted on a shaft 272 for rotation in either a clockwise or counterclockwise direction for the purpose of initiating a tab set or a tab release operation. When the key button is urged in a counterclockwise direction a connecting rod 273 associated therewith through a clevis pin 274 urges a crank lever 276 to rotate about its shaft pin 277, which produces longitudinal movement of a second connecting rod 278 secured at one end of crank 276. The rod 278 is connected to mechanism (not shown) which produces tab set and tab release. In order to make it possible to produce a tab set or a tab release remotely, a double-acting solenoid 281 is secured on mounting plate 19 at a location which causes the U-shaped end portion 282 of the solenoid actuator arm 283 to receive a depending leg 284 of crank lever 276 when the base plate is secured to the typewriter. The U-shaped portion 282 of actuator arm 283 enables the crank to be rotated in both the clockwise and counterclockwise directions depending on which coil of the double solenoid arrangement is energized. Thus, the operation of key button 271 can be electrically simulated through the solenoid 281.

A switch 301 and a switch 302 serve to sense the movement of rod 273 in either the direction which produces tab set, or the direction which represents tab release. In its normal nonoperative state, the rod 273 is in a centered position which places both switches 301 and 302 in a nonoperated condition. Only when key button 271 is operated is one of the switches operated, and the particular switch opreated will identify the function initiated as either a tab set or a tab release.

Almost any typewriter operation in addition to those described herein, can be uniquely identified by properly disposing a switch on mounting plate 19, or electrically initiated by a properly disposed solenoid. Thus, while all of the possible functions (non-print operations) performed by a typewriter may not have been described herein, this is not to be taken to mean that these functions are beyond the capabilities of the present invention. The functions specifically provided for in the embodiment of the invention disclosed herein, are considered essential to the proper operation of a typewriter as a communications device, whereas additional typewriter functions are optionally necessary depending upon the particular use of the commumciations system involved.

The typewriter non-print operations of line feed and carrier return are double cycle functions in that during these operations the typewriter drive shaft which drives the mechanisms for producing those two non-print operations rotates one complete revolution, rather than a half-revolution as in the case of space or back-space. Since the electronics normally associated with the base plate of the present invention are most advantageously designed to produce a signal pattern for every half revolution of the typewriter drive shaft, some means must be provided to suppress the second signal pattern during the second half cycle of the line feed and carrier return functions if double line feeds are to be avoided (double carrier returns producing double line feeds as well). To this end a suppression switch 311 is disposed on plate 19

(see FIG. 3) at a location which places its actuator arm 312 (see FIG. 9) adjacent to an arm 313, which is part of the line feed mechanism which operates after the first cycle (half revolution). This switch thus provides the means for suppressing the second signal pattern and thereby enables a single line feed signal to be transmitted. In the event it is desired to be able to transmit double line feeds, a switch can be provided which cooperates mechanically (from a position on the mounting plate) with the double line feed selector mechanism so as to be operated thereby. This switch is electrically disposed across suppression switch 311 so as to form a short circuit thereacross when operated whereby the second signal pattern will not be suppressed and double line feed will result.

When the electrical power to the typewriter comes from a cooperating unit rather than directly from a wall cource, actuation of the normal typewriter on/off switch 316 (see FIG. 4) through linkage 317, will not result in energization unless the cooperating unit is also connected to power. To avoid the necessity of operating two switches and thus to avoid any operating requirements unknown to the typist otherwise familiar with the IBM Selectric, a switch 318 is located on mounting plate 19 (see FIG. 3). The actuator arm 319 (see FIG. 4) of this on/off switch is located adjacent to a transversely extending rod 320 which moves laterally in response to operation of switch 316. The lateral movement of rod 320 operates switch 319 thus providing the necessary electrical condition to direct electrical energy to the cooperating unit and from there to the typewriter.

Figure 12:
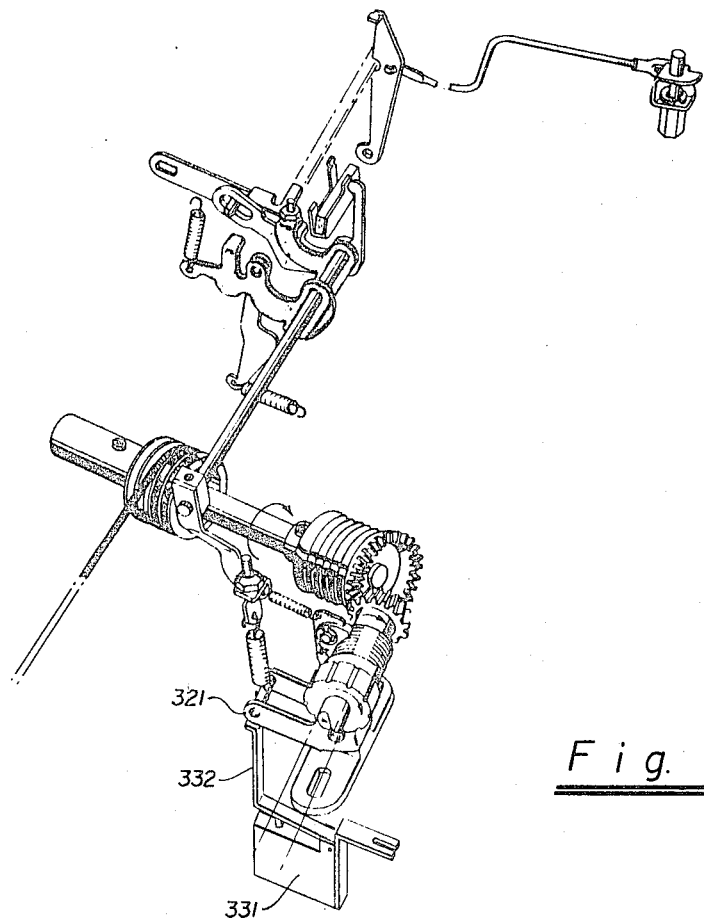
FIG. 12 is an isometric illustration of a portion of the line feed mechanism of a typewriter.

Referring now to FIG. 12, the carrier return mechanism includes a brake actuating arm 321 which, as is well known in the art, is actuated during the return of the carrier (the type-head) to its home position after a carrier return operation is initiated. When the carrier reaches its home position the arm 321 resumes its normal position and typing can then resume. Since the time required to complete a carrier return operation varies in accordance with the number of spaces the carrier is from the left margin stop, and often is several times longer than the time needed to type a symbol, it is essential that no incoming signals be received during this period as the typewriter would not be able to properly respond and typing would occur on the fly. This problem is especially prevalent when a typewriter is responding to signals from a computer or tape where the sending source does not have to pause after a carrier return signal as would be the case if a typewriter were the source of signals.

To prevent the typewriter from being overrun with data during a carrier return, a switch 331 is located on plate 19 at a position which disposes its actuator arm 332 adjacent the arm 321 such that the actuator arm is contacted and the switch operated by movement of arm 321. Since arm 321 is operated during the entire travel of the carrier to its left margin stop, the switch 331 is capable of operating as a means of preventing data from being received during this period.

While the base plate of the present invention is designed to overlay the bottom of the typewriter, the components which form the base plate have been carefully located so as not to overlay adjusting screws which are operated from the bottom of the typewriter. With this limitation observed, the provision of opening 336 and opening 337 in the plate 19 (see FIG. 3) makes it possible to make the most frequently needed typewriter adjustments without removing the base plate.

Although the plug 28 has been mentioned as necessary in order to make the various solenoids and switches electrically accessible to electronics housed separately, plug 28 is eliminated in the embodiment of the invention which includes circuit boards 339 (see FIG. 3) secured to plate 19 in the spaces between solenoids and switches. In this embodiment all of the needed electronics are internal thus eliminating the need for external access to the base plate components.

One of the most outstanding features of the present invention resides in the fact that the presence of the various switches and solenoids described above in no way imposes limitations on the operation of the typewriter in addition to those which exist without the presence of the base plate. Thus, a typist is free to use the typewrier as a local writing instrument, even though the base plate has been secured to the typewriter, and she can do so without having to be conscious of the fact that the typewriter has expanded capabilities. When it is desired to use the typewriter as a computer read-in device or a communication sender, the typist once again experiences no additional typing reqirements. To operate the machine as a sender it is only necessary to operate a switch and type in the normal manner.

I claim:

1. A readily attachable and removable base plate suitable for interconnection to a typewriter, said base plate including a plurality of switching elements utilized to internally generate electrical output signals for both print and function operations in response to typewriter operations and a plurality of electrical drive elements utilized to initiate both print and function typewriter operations in response to external input signals, the typewriter having a plurality of internal members which move in conjunction with both print and function typewriter operations, the base plate comprising in combination:
   a mounting plate attachable to said typewriter;
   switching elements for generating said output signals and electrical drive elements to initiate operations of said typewriter in response to said input signals fastened to said mounting plate and carried thereon;
   a plurality of actuator arms carried on said mounting plate for associating specific ones of said switching elements and electrical drive elements with specific ones of said movable print internal members of said typewriter; and
   a plurality of actuator arms carried on said mounting plate for associating specific ones of said switching elements and electrical drive elements with specific ones of said function internal members of said typewriter;
   at least a majority of each of said plurality of actuator arms being positioned on said mounting plate for extensions into said typewriter to positions adjacent the associated ones of said typewriter members for co-action therewith without direct physical attachment thereto, said absence of physical attachment enabling said typewriter to be rapidly and readily adapted for transmitting and receiving signals by combination with said base plate.

2. The attachment of claim 1, wherein the typewriter internal members are in part selector bails which extend transversely across the typewriter and which operate in various combinations to select letters and numbers for printing, and wherein said switching elements comprise at least one latch switch means for each selector bail, said latch switch means being disposed on said mounting plate at locations which place the associated actuator arm adjacent their associated selector bails when said mounting plate is attached to a typewriter whereby operation of a selector bail results in operation of the switch means associated therewith.

3. The attachement of claim 1 wherein;
   said mounting plate comprises a single member of such dimension as to fit wholly within the bottom periphery of a typewriter to which it is to be attached.

4. The attachment of claim 3 wherein said mounting plate comprises:
   a main mounting portion lying in a single plane; and
   at least one smaller mounting portion contiguous with said main mounting portion and at an angle relative thereto.

5. The attachment of claim 1 wherein; said mounting plate has said switching elements and electrical drive elements mounted on the side thereof which faces away from said internal members of said typewriter and has openings through which the actuator arms extend to the other side of said plate.

6. The attachment of claim 1 wherein the typewriter is further described as including a frame having a plurality of securing means which are accurately disposed with respect to the typewriter components; and further comprising indexing means accurately located on said mounting plate and operable in cooperation with the typewriter securing means to locate and secure said mounting plate to the typewriter.

7. The attachment of claim 6 wherein the indexing means define apertures through said mounting plate and further comprising a plurality of studs which extend from the typewriter frame a distance sufficient to engage said apertures before said actuator arms reach the region of said internal members of the typewriter with which said arms co-act whereby during attachment said studs engage said indexing means prior to any switching element or drive element actuator arm entering the typewriter thus assuring correct alignment.

8. The attachment of claim 6 wherein said securing means are feet for supporting the typewriter.

9. The attachment of claim 1 wherein the typewriter is of the type which normally includes a bottom cover pan, further comprising:

spacer means secured between the typewriter and its bottom cover pan whereby sufficient space is provided for said mounting plate and said switching elements and electrical drive elements.

10. The attachment of claim 9 wherein said spacer means comprises:

a rigid band formed in the shape of the periphery of the bottom of the typewriter; and clip means secured to said band for securing said band to said typewriter and the bottom pan to said band.

11. The attachment of claim 1 further comprising adjustable means securing said switching elements and electrical drive elements to said mounting plate wherein said securing means provide said switching elements and electrical drive elements with a degree of freedom in the plane of the portion of the mounting plate to which they are secured.

12. The attachment of claim 1 wherein said actuator arms are secured to said mounting plate at locations which place said arms within the typewriter mechanism at positions spaced from the path of travel of moveable components thereof other than specific components with which said arms cooperate so as to in no way affect the normal operation of the typewriter whereby a typist can use the typewriter without having to observe any special rules due to the fact that the mouning plate is attached to the typewriter.

13. The attachment of claim 1 wherein said switching elements are switches of the enclosed contact type each having an individual enclosure surrounding the contacts thereof.

14. The attachment of claim 1 wherein said switching elements are double circuit switches.

15. The attachment of claim 1 wherein the typewriter is further characterized by cycle clutch means which operates every time the typewriter performs a print operation; and wherein said switching elements includes cycle clutch switch means disposed on said mounting plate at a location which places said cycle clutch operatively adjacent the cycle clutch means whereby said cycle clutch means is operated each time said cycle clutch means operates.

16. The attachment of claim 1 wherein the typewriter is further characterized by cycle clutch means which operates each time the typewriter performs a print operation wherein the cycle clutch means operation includes a one half revolution of a cycle clutch shaft associated with the cycle clutch means; and said switching elements including a cycle clutch switch disposed on said mounting plate at a location which places said switch adjacent the cycle clutch means when said plate is attached to a typewriter, said cycle clutch switch including an actuator arm which engages said cycle clutch means and senses operation of said cycle clutch means including a one half revolution of the cycle clutch shaft.

17. The attachment of claim 16 wherein the cycle clutch means is characterized by a cam member on the cycle clutch shaft wherein the cam shape includes two equally spaced lobes;

said switch means actuator arm is disposed to engage the cam member whereby said cycle clutch switch is operated each one half revolution of said cycle clutch shaft.

18. The attachment of claim 17 wherein said cycle clutch switch is a double circuit switch.

19. The attachment of claim 1 wherein the typewriter is further described as including a tabulator mechanism which has a member which rotates about a shaft when a tabulator key button is depressed, and which causes the tabulator mechanism to operate when rotated, wherein said switching elements and said electrical drive means include:

a tabulator switch means secured to said mounting plate at a location which disposes an associated tabulator switch means actuator arm adjacent to the tabulator member when said plate is affixed to the typewriter whereby said tabulator switch means is operated when the tabulator mechanism is operated;

a tabulator solenoid means secured to said mounting plate at a location which disposes an associated solenoid means actuator arm adjacent to the tabulator member when said plate is affixed to the typewriter whereby energization of said solenoid drives said solenoid actuator arm into the member causing the tabulator mechanism to operate.

20. The attachment of claim 19 wherein said tabulator switch means is a double circuit switch.

21. The attachment of claim 1 wherein the typewriter is further described as including a tabulator-set and tabulator-clear mechanism and wherein said switching elements and said electrical drive means include:

a tabulator-set switch means secured on said mounting plate at a location which places an associated tabulator-set switch actuator arm adjacent to the tabulator-set mechanism when said mounting plate is affixed to the typewriter wherein said switch means is operated when the mechanism performs a tabulator-set operation;

a tabulator-clear switch means secured on said mounting plate at a location which places an associated tabulator-clear switch actuator arm adjacent to the tabulator-clear mechanism when said mounting plate is affixed to the typewriter wherein said switch means is operated when the mechanism performs a tabulator-clear operation; and a double acting solenoid secured on said mounting plate at a location which places an associated actuating arm adjacent to the tabulator-set and tabulator-clear mechanisms when said mounting plate is affixed to the typewriter whereby energization of one portion of said double acting solenoid induces a tabulator-set operation and energization of the other portion of said double acting solenoid induces a tabulator-clear operation.

22. The attachment of claim 1 wherein the typewriter is further described as including a case shift mechanism comprising a case shift bracket which is movably mounted and which induces operation of a case shift arm when moved, and wherein said switching elements and electrical drive elements include;

a pair of normally closed case shift switches electrically joined in series and secured to said mounting plate at a location which disposes their actuator arms adjacent the case shift arm when said mounting plate is attached to the typewriter, said switch actuator arms located such that one contacts the case shift arm and is operated when the case shift arm is not operated and does not contact the case shift arm when the case shift arm is operated while the actuator arm of the other of said switches does not contact the case shift arm when the case shift arm is not operated but does contact the case shift arm and thus operates the switch when the case shift arm is operated, the location of said switches further providing that both of said switch actuator arms are unoperated and thus both switches are closed only during the transition of the case shift arm from either its unoperated position to its operated position, or from its operated position to its unoperated position;

a case identification switch secured on said mounting plate at a location which disposes its actuator arm adjacent to said case shift bracket when said mounting plate is attached to the typewriter such that said actuator arm is contacted and said switch operated when said bracket is moved to the position which corresponds to upper case and said actuator arm is not contacted and thus said switch is not operated when said bracket is in the position corresponding to lower case; and a case shift solenoid secured on said mounting plate at a location which disposes its actuator arm adjacent to the case shift bracket when said mounting plate is attached to the typewriter such that energization of said solenoid results in movement of said solenoid actuator arm which in turn moves the case shift bracket to induce operation of the case shift arm.

23. The attachment of claim 22 wherein said case shift solenoid is further described as a mechanical latching solenoid, and said operating means further comprises:

an unlatching solenoid operatively disposed adjacent to said case shift solenoid and operable to unlatch said case shift solenoid.

24. The attachment of claim 1 wherein the typewriter is further characterized by an on/off mechanism which includes a link which moves when the on/off mechanism is operated and wherein said switching elements includes;

an on/off switch secured on said mounting plate at a location which disposes the actuator arm of said on/off switch adjacent to the on/off mechanism link when said mounting plate is attached to the typewriter such that said on/off switch is operated when the typewriter on/off mechanism is operated.

25. The attachment of claim 1 wherein the typewriter has an index mechanism including a return portion which operates after an index operation cycle is initiated and before the index operation cycle is half complete and wherein said switching elements further comprises;

an index suppression switch secured on said mounting plate at a location which disposes its actuator arm adjacent to the index mechanism return portion when said plate is secured to the typewriter whereby said suppression switch is operated during the first half cycle of the index operation cycle.

26. The attachment of claim 1 wherein the typewriter has a carrier return mechanism including a lever which moves to an operate position during the return of the carrier to its start position and wherein said switching elements further comprises;

a carrier return suppression switch secured on said mounting plate at a location which disposes the actuator arm of said switch adjacent to the carrier return mechanism lever whereby said carrier return suppression switch is operated during the return of the carrier to its start position.

27. The attachment of claim 1 wherein said mounting plate has openings formed therein at locations which overlie typewriter adjusting mechanisms when said mounting plate is secured to the typewriter.

References Cited

UNITED STATES PATENTS

| | | | |
|---|---|---|---|
| 3,233,715 | 2/1966 | Flieg | 197—19 |
| 3,269,509 | 8/1966 | Smith | 197—19 |
| 3,294,117 | 12/1966 | Echemeyer et al. | 197—19 XR |
| 3,297,124 | 1/1967 | Sems | 197—19 |
| 765,799 | 7/1904 | Spiegel | 197—19 |
| 765,960 | 7/1904 | Curtis | 197—19 |
| 2,327,172 | 8/1943 | Carlson | 197—20 |
| 2,377,205 | 5/1945 | Buckley | 197—20 XR |
| 2,605,879 | 8/1952 | O'Halloran | 197—20 |
| 2,924,321 | 2/1960 | Ziskind et al. | 197—19 |
| 2,958,567 | 11/1960 | Oxby et al. | 197—19 XR |
| 3,045,795 | 7/1962 | Morrison et al. | 197—20 |
| 3,063,537 | 11/1962 | Allen | 197—19 |
| 3,197,618 | 7/1965 | Stanley et al. | 197—20 XR |
| 3,219,165 | 11/1965 | Greene et al. | 197—20 |
| 3,353,744 | 11/1967 | Becking et al. | 197—20 XR |

EDGAR S. BURR, *Primary Examiner.*

PO-1050
(5/69)

UNITED STATES PATENT OFFICE
CERTIFICATE OF CORRECTION

Patent No. 3,452,851    Dated July 1, 1969

Inventor(s) LAWRENCE HOLMES, JR.

It is certified that error appears in the above-identified patent and that said Letters Patent are hereby corrected as shown below:

```
Column 1, line 68, "wiring" should be --writing--.
Column 2, line 31, "disadvantages" should be --disadvantage-
Column 7, line 4, "applictaion" should be --application--.
Column 7, line 50, "therto" should be --thereto--.
Column 7, line 52, "adjustmens" should be --adjustments--.
Column 8, line 51, "crtical" should be --critical--.
Column 10, line 9, "vertical portion 107" should be --
                   vertical portion 108--.
Column 12, line 66, "indiate" should be --indicate--.
Column 17, line 17, "course" should be --source--.
Column 18, line 8, "typewrier" should be --typewriter--.
Column 18, line 15, "reqirements" should be --requirements--

Claim 1, line 47, "extensions" should be --extension--.
Claim 3, "attachement" should be --attachment--.
```

SIGNED AND
SEALED

APR 28 1970

(SEAL)
Attest:

Edward M. Fletcher, Jr.
Attesting Officer

WILLIAM E. SCHUYLER, JR.
Commissioner of Patents